Figure 1:
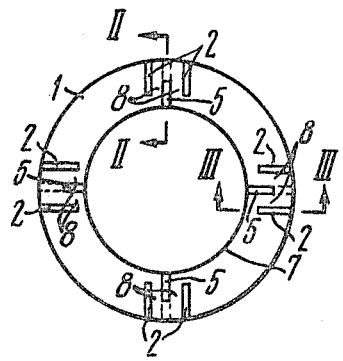

United States Patent
Prostorov et al.

[11] 3,735,992
[45] May 29, 1973

[54] PISTON RING

[76] Inventors: Igor Semenovich Prostorov, poselok Krivka, ulitsa Festivalnaya, 3, kv. 3, Leningradskaya oblast; Vladimir Sergeevich Davydov, prospekt Smirnova, 6, kv. 21, Leningrad, both of U.S.S.R.

[22] Filed: Mar. 14, 1972

[21] Appl. No.: 234,522

[52] U.S. Cl. ..................................277/215, 92/249
[51] Int. Cl. .................................................F16j 9/08
[58] Field of Search ...................277/214–222, 27; 92/248, 249

[56] References Cited

UNITED STATES PATENTS 1,999,094   4/1935   Godron ...............................277/215
2,311,731   2/1943   Bowers................................277/215

FOREIGN PATENTS OR APPLICATIONS 527,842   10/1940   Great Britain.......................277/216

*Primary Examiner*—Samuel B. Rothberg
*Assistant Examiner*—Robert I. Smith
*Attorney*—Eric H. Waters, John G. Schwartz and J. Harold Nissen

[57] ABSTRACT

The present invention relates to piston machines and, more particularly, to piston rings.

The piston ring 1 has blind slots 2 and slots 5 which form channels. The blind slots 2 open on the outer surface 3 and on the face surface 4. The slots 5 are made from inside of the ring 1 and form channels which open on the face surfaces 4 and 6 and on the outer surface 3. The spaces between the adjacent slots 2 and 5 form flexible bridges.

2 Claims, 4 Drawing Figures

PISTON RING

The present invention relates to piston machines and, more specifically, to piston rings. The invention can find preferential employment as a piston seal, mostly in the built-up pistons of high-pressure compressors.

Known in the art is an integral piston ring with slots arranged alternately on its outer and cylindrical surfaces. The slots extend through the ring in the axial direction. Bending of the flexible bridges between the adjacent slots compensates for the elongation and compression of the circular fibres of the ring caused by the variations of temperature.

However, to provide efficient sealing of, say, the cylinder of a piston compressor, two rings of such a type should be placed side by side so that the through slots of one ring would be covered by the body of the other one.

An object of the present invention resides in improving the reliability of sealing.

Another object of the invention resides in improving the seal.

In accordance with these and other objects the invention consists in that the piston ring has blind slots opening on its outer surface and on one of its face surfaces; between at least two blind slots there is a slot made from inside of the ring and forming a channel which opens on each face and outer surface of the ring.

Such a design of the ring rules out the necessity for covering its slots by another ring, improves the reliability and sealing capacity of the ring.

According to one of the embodiments of the invention, the channel made from inside of the ring is covered by a circular insert.

The ring with a circular insert installed, say, in the cylinder of a compressor, functions as a throttling ring and is capable of being self-centered in said cylinder by the flow of gas moving along the outer surface of the ring.

Figure 2:
Figure 3:
Figure 4:
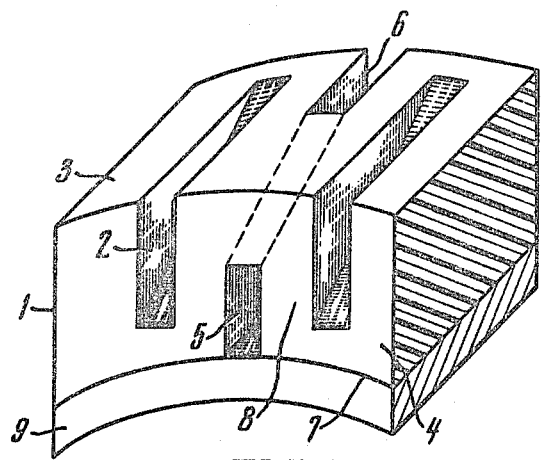

Other objects and advantages of the invention will become more apparent from the detailed description of the ring that follows, and from the accompanying drawings, in which:

FIG. 1 is a diagrammatic view of the piston ring according to the invention;
FIG. 2 is a section taken along line II—II in FIG. 1;
FIG. 3 is a section taken along line III—III in FIG. 1;
FIG. 4 is an axonometric view of the piston ring according to the invention, with a circular insert.

The piston ring 1 (FIG.1) made of a nonmetallic material, for example a fluoroplastic-based material, has blind slots 2 which open on the outer surface 3 and on the face surface 4, and slots 5 made from inside of the ring 1 and located between two adjacent blind slots 2. Each slot 5 forms a channel which opens on the face surfaces 4, 6 and on the outer surface 3. The slots 5 are pentagon-shaped (FIG.2) while the blind slots 2 have the shape of a triangle (FIG.3). The adjacent slots 2 and 5 are made so that their counter-opposed recesses are mutually covered, forming flexible inclined bridges 8 (FIG.4).

The piston ring functions as follows.

The piston ring 1 is installed without a clearance or with a minimum clearance on the cylindrical surface of the piston groove (not shown in the drawings) which covers completely the slots 5 on the side of the inner surface 7 of the ring 1. Besides, being an element of the composite piston seal, the ring 1 is directed with its face surface 6 towards the high-pressure side so that the face surface 4 proves to be directed towards the low-pressure side. Acted upon by the pressure differential applied to the face surfaces 6 and 4, the ring is forced off towards the low-pressure side and is pressed against the face surface of the piston groove (not shown in the drawings) so that the outlets of the slots 5 at the low-pressure side prove to be completely covered, thus ensuring the requisite sealing of, say, compressor cylinder at the side of the compression chamber.

If the piston ring 1 is installed in, say, a compressor cylinder (not shown in the drawings), the clearance between its outer surface 3 and the inner surface of the cylinder (not shown in the drawings) is taken to be a minimum one, just sufficient for ensuring the temperature expansion of the radial thickness of the ring 1. Before the machine reaches the preset temperature level, the ring 1 has a radial clearance and functions as a throttling ring with the main gap along the outer surface 3. After the compressor stage has reached the rated temperature, the linear expansion of the ring 1 is made up for by bending of the flexible bridges 8 between the adjacent slots 2 and 5. The radial clearance between the inner surface of the cylinder (not shown in the drawings) and the outer surface 3 of the ring 1 becomes smaller. Therefore, the piston ring 1 starts functioning as a throttling ring with the gaps of a smaller size.

Under the effect of the different pressures applied to the outer surface 3 and the inner surface 7, the outer surface 3 of the ring can be pressed against the inner surface of the cylinder (not shown in the drawings). In this case the piston ring functions as a self-sealing element of the piston seal, ensuring a minimum leakage.

In case of a sharp temperature drop, for example, in the compressor cylinder (not shown in the drawings) the reduction of the outside diameter of the ring 1 is likewise made up for by bending of the flexible bridges 8.

Second version of the piston ring (FIG.4).

The piston ring 1 is installed without a clearance on the circular insert 9 which covers completely the slots 5 from the inner surface 7 of the ring 1. Then the ring 1 with the circular insert 9 is installed into the piston groove (not shown in the drawings) and, for example, into the compressor cylinder (not shown in the drawings) with a minimum clearance between the outer surface 3 of the ring and the inner surface of the cylinder.

The ring 1 installed on the circular insert 9 functions as follows.

The gas flowing along the outer surface 3 of the ring 1 aligns it in the cylinder (not shown in the drawings). As a result, the ring 1 retains its sealing ability even if the piston is cocked.

The piston ring, according to the present invention, can be used with an expander (not shown in the drawings). Such a ring provided with an expander features a high sealing ability since the flexible bridges allow the expander to press the ring to, say, the inner surface of the compressor cylinder (not shown in the drawings).

The piston ring, according to the invention, provided with an expander, functions as a self-sealing element of the piston seal (not shown in the drawings), similarly to the above-described version. Besides, the expander presses the outer surface 3 constantly against the wall of the cylinder (not shown in the drawings).

The piston rings made of, say, a fluoroplastic-based material can be used in the stages of the piston compresor without lubricating the cylinder.

The metal piston rings made according to the invention and used with expanders must be used for the ultrahigh-pressure stages with lubricated cylinders.

The metal piston ring, according to the invention, made with a preset nominal size of the outer cylindrical surface and preliminarily opened to a preset size for bending and thermal fixing of the flexible bridges will possess the requisite flexibility. Such a piston ring must be used in the high- and medium-pressure stages with lubricated cylinders.

What is claimed is:

1. An integral piston ring comprising: an outer surface, an inner surface, and two face surfaces one of which must be directed towards the zone of relatively low pressure of the working fluid while the other one - towards the zone of relatively high pressure; blind slots which open on said outer surface and on said face surface directed towards the zone of relatively low pressure, a part of the ring between said slots forming a flexible bridge; a slot located between two of said blind slots, made from inside of said ring in the zone of said bridge and opening on the outer surface from the side of the face surface which is directed towards the zone of relatively high pressure; said slot forms a channel for the passage of the working fluid from the zone of relatively high pressure into the zone of relatively low pressure.

2. An integral piston ring according to claim 1, wherein said channel made inside of said ring is covered by a circular insert.

* * * * *